(12) United States Patent
Izumo

(10) Patent No.: US 11,807,042 B2
(45) Date of Patent: Nov. 7, 2023

(54) PNEUMATIC TIRE FOR HEAVY LOAD

(71) Applicant: Sumitomo Rubber Industries, Ltd., Kobe (JP)

(72) Inventor: Suguru Izumo, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/584,530

(22) Filed: Jan. 26, 2022

(65) Prior Publication Data

US 2022/0234388 A1 Jul. 28, 2022

(30) Foreign Application Priority Data

Jan. 27, 2021 (JP) .................................. 2021-011029

(51) Int. Cl.
| | | |
|---|---|---|
| *B60C 11/00* | (2006.01) | |
| *B60C 1/00* | (2006.01) | |
| *C08K 3/36* | (2006.01) | |
| *C08K 5/103* | (2006.01) | |
| *C08L 9/06* | (2006.01) | |
| *B82Y 40/00* | (2011.01) | |
| *C08K 3/04* | (2006.01) | |

(52) U.S. Cl.
CPC ........ *B60C 1/0016* (2013.01); *B60C 11/0075* (2013.01); *C08K 3/36* (2013.01); *C08K 5/103* (2013.01); *C08L 9/06* (2013.01); *B60C 2200/06* (2013.01); *B82Y 40/00* (2013.01); *C08K 3/04* (2013.01); *C08K 2201/011* (2013.01)

(58) Field of Classification Search
CPC .......... B60C 2200/06; B60C 2200/065; B60C 1/0016; B60C 11/005; B60C 11/00; B60C 2011/0025
See application file for complete search history.

(56) References Cited

U.S. PATENT DOCUMENTS

| | | | | |
|---|---|---|---|---|
| 5,066,721 A | * | 11/1991 | Hamada | ................ B60C 1/0016 525/105 |
| 5,430,088 A | | 7/1995 | Ohashi et al. | |
| 2009/0101258 A1 | * | 4/2009 | Nakamura | ................ C08L 9/00 152/209.5 |

(Continued)

FOREIGN PATENT DOCUMENTS

| | | |
|---|---|---|
| JP | 5-254314 A | 10/1993 |
| JP | 6-279624 A | 10/1994 |

(Continued)

OTHER PUBLICATIONS

Extended European Search Report for corresponding European Application No. 22151000.1, dated Jun. 1, 2022.

*Primary Examiner* — Cedrick S Williams
(74) *Attorney, Agent, or Firm* — Birch, Stewart, Kolasch & Birch, LLP

(57) ABSTRACT

An object of the present disclosure is to provide a pneumatic tire for heavy load having improved fuel efficiency and rib tear resistance. Provided is a pneumatic tire for heavy load comprising a tread, wherein the pneumatic tire has a difference in modulus at 200% elongation between a base rubber layer and a cap rubber layer is set within a predetermined range and an acetone extraction amount of the base rubber layer is set within a predetermined range.

15 Claims, 4 Drawing Sheets

(56) References Cited

U.S. PATENT DOCUMENTS

| | | | | |
|---|---|---|---|---|
| 2014/0128531 A1* | 5/2014 | Miyazaki | ................ | C08L 9/00 524/496 |
| 2014/0275331 A1* | 9/2014 | Kondo | ................ | B60C 1/0016 523/156 |
| 2014/0311647 A1* | 10/2014 | Matsumura | ........... | B60C 9/1835 152/537 |
| 2018/0281524 A1 | 10/2018 | Yasuda | | |

FOREIGN PATENT DOCUMENTS

| | | | |
|---|---|---|---|
| JP | 2005-67236 A | 3/2005 | |
| JP | 2017-71275 A | 4/2017 | |
| WO | WO-2015182078 A1 * | 12/2015 | ........... B60C 1/0016 |

* cited by examiner

FIG.2
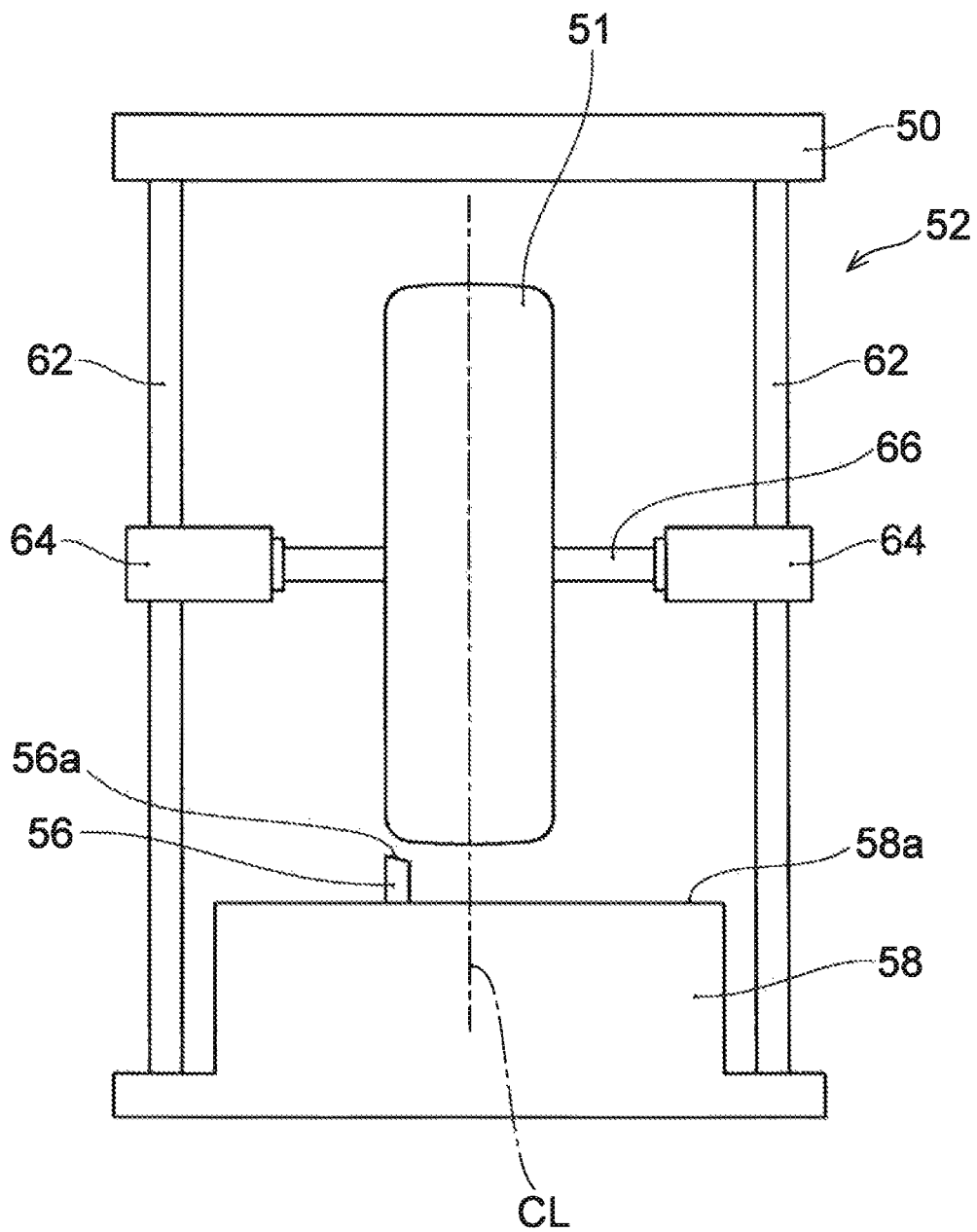
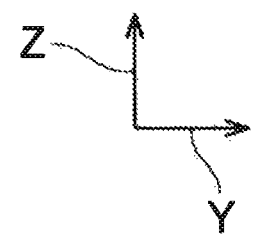

PNEUMATIC TIRE FOR HEAVY LOAD

TECHNICAL FIELD

The present disclosure relates to a pneumatic tire for heavy load.

BACKGROUND OF THE INVENTION

As a method of improving breaking strength of a tire for a truck/bus, a technique of making carbon black to be micronized or to be a high structure is known (for example, JP H06-279624 A).

SUMMARY OF THE INVENTION

It cannot be said that the above-described method of making carbon black to be micronized or to be a high structure is sufficient for improving fuel efficiency and rib tear resistance of a tire. Moreover, dispersibility of carbon black also deteriorates due to deterioration of processability associated with micronization, and conversely, abrasion resistance of a tire may deteriorate. Therefore, there has been a limit to a method of improving performance by improving a conventional carbon black.

Moreover, due to influences of recent environmental regulations, there has been a growing demand for achieving abrasion resistance, as well as fuel efficiency, breaking resistance, and the like at a high level, even in a tire for a truck/bus.

An object of the present disclosure is to provide a pneumatic tire for heavy load having improved fuel efficiency and rib tear resistance.

As a result of intensive studies, it was found that the above-described problems can be solved by setting a difference in modulus at 200% elongation between a base rubber layer and a cap rubber layer within a predetermined range and setting an acetone extraction amount of the base rubber layer within a predetermined range.

That is, the present disclosure relates to a pneumatic tire for heavy load comprising a tread, the tread having a cap rubber layer of a tread surface and a base rubber layer adjacent to inside in a tire radial direction of the cap rubber layer, the cap rubber layer and the base rubber layer being composed of a rubber composition comprising a rubber component, wherein an acetone extraction amount of the rubber composition of the base rubber layer is less than 4.0% by mass, and wherein, where a modulus at 200% elongation at 23° C. of the rubber composition of the base rubber layer is defined as M200b (MPa) and a modulus at 200% elongation at 23° C. of the rubber composition of the cap rubber layer is defined as M200c (MPa), M200b and M200c satisfy the following inequality (1):

$$0 \leq M200c - M200b \leq 5 \tag{1}$$

According to the present disclosure, provided is a pneumatic tire for heavy load having improved fuel efficiency and rib tear resistance.

BRIEF DESCRIPTION OF THE DRAWINGS

FIG. 2 is a front view schematically showing an example of a test device used for evaluating rib tear resistance of the pneumatic tire for heavy load in the present disclosure.

DETAILED DESCRIPTION

Figure 1:
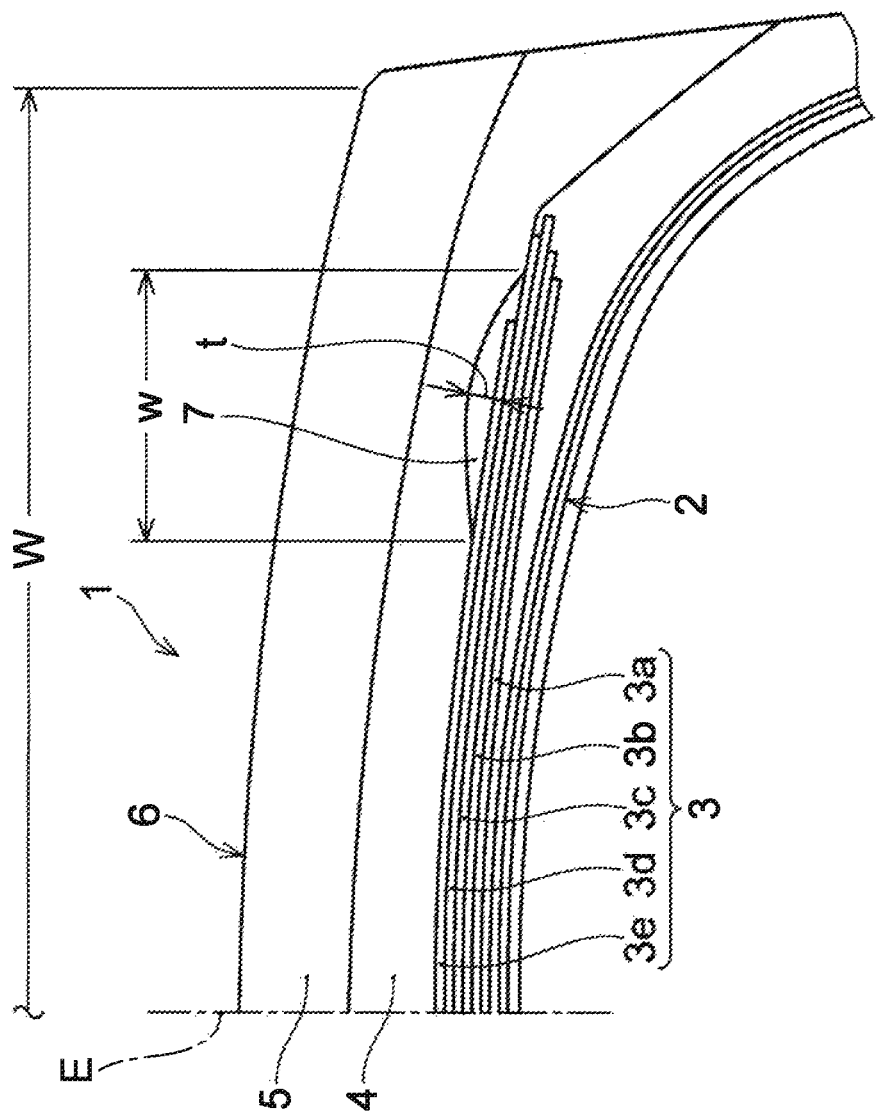
FIG. 1 is a cross-sectional view in a tread width direction showing a half part of a tread part of the pneumatic tire for heavy load of the present disclosure.

The pneumatic tire for heavy load according to the present disclosure is a pneumatic tire for heavy load comprising a tread, the tread having a cap rubber layer of a tread surface and a base rubber layer adjacent to inside in a tire radial direction of the cap rubber layer, the cap rubber layer and the base rubber layer being composed of a rubber composition comprising a rubber component, wherein an acetone extraction amount of the rubber composition of the base rubber layer is less than 4.0% by mass, and wherein, where a modulus at 200% elongation at 23° C. of the rubber composition of the base rubber layer is defined as M200b (MPa) and a modulus at 200% elongation at 23° C. of the rubber composition of the cap rubber layer is defined as M200c (MPa), M200b and M200c satisfy the following inequality (1):

$$0 \leq M200c - M200b \leq 5 \tag{1}$$

Although it not intended to be bound by theory, for example, the following can be considered as a mechanism in which effects of the present disclosure are exhibited.

If a modulus balance of the base rubber layer and the cap rubber layer is deteriorated, the deterioration may cause a damage on the tread such as peeling at an interface between the cap rubber layer and the base rubber layer and cracks in the base tread rubber.

Therefore, it is considered that, by setting a difference in modulus at 200% elongation between the base rubber layer and the cap rubber layer within a predetermined range and setting an acetone extraction amount of the base rubber layer within a predetermined range, the modulus balance of the base rubber layer and the cap rubber layer could be optimized, and rib tear resistance could be improved while suppressing heat generation of the tread rubber.

Furthermore, it is considered that fuel efficiency and rib tear resistance could be improved by cooperation of a structure of a reinforcing rubber layer which will be described later and the above-described physical properties of the rubber composition of each layer of the tread.

The tan δ at 70° C. (70° C. tan δ) of the rubber composition of the base rubber layer is preferably less than 0.040.

When a strength at break at 23° C. of the rubber composition of the base rubber layer is defined as TB (MPa) and an elongation at break at 23° C. is defined as EB (%), the tan δ at 70° C. (70° C. tan δ) of the rubber composition of the base rubber layer, TB and EB preferably satisfy the following inequality (2):

$$TB \times EB / 70° C. \tan \delta \geq 24.5 \times 10^5 \tag{2}$$

The rubber component of the base rubber layer preferably comprises a butadiene rubber.

A thickness of the base rubber layer is preferably 1 to 70% of a total thickness of the tread.

The pneumatic tire for heavy load according to the present disclosure comprises four or more belt layers inside in a tire radial direction of the base rubber layer, wherein at least one surface of an outer surface in a tire radial direction of the belt layer on the outermost side in the tire radial direction and an outer surface in the tire radial direction of the belt layer having the widest width is covered with a reinforcing rubber layer that terminates without reaching a tire equatorial plane, and wherein a value of tan δ at 70° C. (70° C. tan δ) of the rubber composition of the reinforcing rubber layer is preferably larger than a value of tan δ at 70° C. (70° C. tan δ) of the rubber composition of the base rubber layer.

A width w of the reinforcing rubber layer is preferably 10 to 40% of a tread width W of the tread.

The maximum thickness of the reinforcing rubber layer is preferably 5 to 25% of a groove depth of a width direction groove present at a position of ¼ the tread width of the tread from a tire equator line.

The rubber composition of the base rubber layer preferably comprises a glycerin fatty acid ester.

The pneumatic tire for heavy load comprising the rubber composition for tread which is one embodiment of the present disclosure will be described in detail below. However, the following descriptions are illustrative for explaining the present disclosure, and are not intended to limit the technical scope of the present disclosure to this description range only. Besides, in the present specification, a numerical range identified with "to" means to include the numerical values of both ends.

<Pneumatic Tire for Heavy Load>

FIG. 1 shows a cross-sectional view in a tread width direction showing a half part of a tread part of the pneumatic tire for heavy load of the present disclosure, but the present disclosure is not limited thereto.

In FIG. 1, the reference numeral 1 represents a tread part, the reference numeral 2 represents a carcuss composed of one or more carcuss plies extending toroidally between one bead core and the other bead core, and the reference numeral 3 represents a belt composed of five laminated belt layers 3a to 3e arranged outside in a tire radial direction of the carcuss 2. In addition, a base rubber layer 4 and a cap rubber layer 5 are laminated outside in a tire radial direction of the belt 3.

Here, at least one surface of an outer surface in a tire radial direction of the belt layer 3e on the outermost side in the tire radial direction and an outer surface in a tire radial direction of the belt layer 3c having the widest width (the outer surface in the tire radial direction of the belt layer 3e on the outermost side in the tire radial direction in FIG. 1) is covered with a reinforcing rubber layer 7 that terminates without reaching a tire equatorial plane E, inside a tire radial direction of a tread rubber 6.

By making a value of tan δ at 70° C. (70° C. tan δ) of a rubber composition of the reinforcing rubber layer 7 larger than a value of tan δ at 70° C. (70° C. tan δ) of a rubber composition of the base rubber layer, both heat generation durability of a tire and durability of a belt can be achieved at a high level.

A width w of the reinforcing rubber layer 7 is preferably 10 to 40%, more preferably 15 to 30% of a tread width W of the tread. Moreover, the maximum thickness t of the reinforcing rubber layer 7 is preferably 5 to 25%, preferably 7 to 20% of the groove depth of the width direction groove present at the position of ¼ the tread width of the tread from the tire equator line. As such, by making the base rubber layer 4 with a low heat generation to fully exhibit its original function while effectively preventing progress of destruction into the base rubber 4, the tread rubber 6 can be imparted with a high durability. Besides, in the present disclosure, the term "tread width of a tread" refers to a tread grounding width defined by a straight line distance parallel to a tire axial line between grounding positions (grounding ends) outermost side in a tire axial direction, when a tire is mounted on an applicable rim, filled with a specified air pressure, and placed perpendicular to a flat plate at a camber angle of zero to give a load corresponding to the maximum load capacity.

"70° C. tan δ" in the present disclosure refers to a loss tangent tan δ under a condition of a temperature at 70° C., an initial strain of 5%, a dynamic strain of ±1%, and a frequency of 10 Hz, in accordance with JIS K 6394: 2007.

70° C. tan δ of the rubber composition of the base rubber layer 4 is preferably less than 0.040, more preferably less than 0.039, further preferably less than 0.038, particularly preferably less than 0.037, from the viewpoint of fuel efficiency.

Besides, the 70° C. tan δ of the base rubber layer 4 can be appropriately adjusted depending on types and compounding amounts of a rubber component, a filler, a silane coupling agent, oil, a glycerin fatty acid ester, and the like which will be described later.

The strength at break (TB) (MPa) and the elongation at break (EB) (%) in the present disclosure refers to a strength at break and an elongation at break (elongation at cutting) measured under a condition of a tensile speed of 3.3 mm/sec in an atmosphere of 23° C. according to JIS K 6251: 2017.

The modulus at 200% elongation in the present disclosure is a tension stress at 200% elongation in a grain direction measured under a condition of a tensile speed of 3.3 mm/sec in an atmosphere of 23° C. according to JIS K 6251: 2017.

A modulus at 200% elongation M200b of the rubber composition of the base rubber layer 4 is preferably 4.0 MPa or more, more preferably 4.5 MPa or more, further preferably 5.0 MPa or more, particularly preferably 5.5 MPa or more, from the viewpoints of suppressing deterioration of fuel efficiency due to distortion of a rubber, suppressing deterioration of steering stability, and suppressing deterioration of uneven abrasion. On the other hand, M200b is preferably 15.0 MPa or less, more preferably 14.0 MPa or less, further preferably 13.0 MPa or less, particularly preferably 12.0 MPa or less. When M200b exceeds 15.0 MPa, it is difficult for an external force to escape, and input is concentrated at an interface between the cap rubber layer 5 and the base rubber layer 4, so that there is a concern that crack growth may occur at the interface.

When a modulus at 200% elongation at 23° C. of the rubber composition of the base rubber layer 4 of the present disclosure is defined as M200b (MPa), and a modulus at 200% elongation at 23° C. of the rubber composition of the cap rubber layer 5 is defined as M200c (MPa), M200b and M200c satisfy the following inequality (1):

$$0 \leq M200c - M200b \leq 5 \tag{1}$$

By setting M200c−M200b to 5 MPa or less and improving a modulus balance of the base rubber layer 4 and the cap rubber layer 5, it is considered that damage on a tread such as peeling at the interface between the base rubber layer 4 and the cap rubber layer 5 and cracks in the base rubber layer 4 can be suppressed.

M200c−M200b are preferably 4 MPa or less, more preferably 3 MPa or less.

Besides, a modulus at 200% elongation, TB and EB of each rubber layer can be appropriately adjusted depending on types and compounding amounts of rubber components, fillers, silane coupling agents, softening agents, and the like which will be described later.

An acetone extraction amount in the present disclosure may be used as an index of concentration of an organic low molecular compound in a plasticizing agent contained in a vulcanized rubber composition. An acetone extraction amount can be calculated by the following equation by immersing each vulcanized rubber test piece in acetone for 24 hours to extract a soluble component and measuring a mass of each test piece before and after extraction in accordance with JIS K 6229-3: 2015.

Acetone extraction amount (%)={(mass of rubber test piece before extraction−mass of rubber test piece after extraction)/(mass of rubber test piece before extraction)}×100

An acetone extraction amount of the rubber composition of the base rubber layer 4 is less than 4.0% by mass, preferably less than 3.9% by mass, more preferably less than 3.8% by mass, further preferably less than 3.7% by mass, particularly preferably less than 3.6% by mass. By setting an acetone extraction amount within the above-described ranges, a balance of fuel efficiency and breaking resistance can be achieved at a high level.

The 70° C. tan δ of the rubber composition of the base rubber layer 4, the strength at break TB (MPa) at 23° C., and the elongation at break EB (%) at 23° C. preferably satisfy the following inequality (2) from the viewpoint of a balance of durability and fuel efficiency of a tire.

$$TB \times EB/70° C. \tan δ \geq 24.5 \times 10^5 \quad (2)$$

TB×EB/70° C. tan δ is preferably $4.6 \times 10^5$ or more, more preferably $4.7 \times 10^5$ or more, further preferably $4.8 \times 10^5$ or more, particularly preferably $4.9 \times 10^5$ or more.

[Rubber Composition]

The pneumatic tire for heavy load of the present disclosure can be improved in fuel efficiency and rib tear resistance by making the above-mentioned structure of the reinforcing rubber layer to cooperate with the above-described physical properties of the rubber composition of each layer of the tread.

<Rubber Component>

The rubber composition of each rubber layer of the tread (the rubber composition for tread) according to the present disclosure preferably comprises at least one selected from the group consisting of an isoprene-based rubber, a styrene-butadiene rubber (SBR), and a butadiene rubber (BR) as rubber components. In particular, it preferably comprises a natural rubber in order to secure durability and abrasion resistance. The rubber component of each rubber layer of the tread may be a rubber component consisting only of an isoprene-based rubber, or may be a rubber component consisting only of an isoprene-based rubber and a BR.

(Isoprene-Based Rubber)

As an isoprene-based rubber, for example, those common in the tire industry can be used, such as an isoprene rubber (IR) and a natural rubber. Examples of the natural rubber includes a non-modified natural rubber (NR), as well as a modified natural rubber such as an epoxidized natural rubber (ENR), a hydrogenated natural rubber (HNR), a deproteinized natural rubber (DPNR), an ultra pure natural rubber, and a grafted natural rubber, and the like. These isoprene-based rubbers may be used alone, or two or more thereof may be used in combination.

The NR is not particularly limited, and those common in the tire industry can be used, examples of which include, for example, SIR20, RSS #3, TSR20, and the like.

A content of the isoprene-based rubber in the rubber component is preferably 50% by mass or more, more preferably 60% by mass or more, further preferably 70% by mass or more, particularly preferably 80% by mass or more, and the rubber component may consist only of an isoprene-based rubber.

(BR)

A BR is not particularly limited, and those common in the tire industry can be used such as, for example, a BR having a cis content (cis-1,4 bond content) of 90% by mass or more (a high cis BR), a rare-earth-based butadiene rubber synthesized using a rare-earth element-based catalyst (a rare-earth-based BR), a BR containing a syndiotactic polybutadiene crystal (a SPB-containing BR), and a modified BR (a high cis modified BR, a low cis modified BR). As the BR, a modified BR is appropriately used from the viewpoint of reinforcing property with a filler. Moreover, the SPB-containing BR can be used to ensure strength when the filler is reduced.

Examples of the high cis BR include, for example, those manufactured by Zeon Corporation, those manufactured by Ube Industries, Ltd., those manufactured by JSR Corporation, and the like. When the high cis BR is compounded, low temperature characteristics and abrasion resistance can be improved. A cis content of the high cis BR is preferably 90% by mass or more, more preferably 95% by mass or more, further preferably 96% by mass or more, particularly preferably 97% by mass or more. Besides, in the present specification, the cis content is a value calculated by infrared absorption spectrometry.

As a rare-earth-based BR, those which are synthesized using a rare-earth element-based catalyst, have a vinyl bond content (1,2-bond butadiene unit amount) of preferably 1.8 mol % or less, more preferably 1.0 mol % or less, further preferably 0.8 mol % or less, and a cis content (cis-1,4 bond content) of preferably 95 mol % or more, more preferably 96 mol % or more, further preferably 97 mol % or more, can be used. As the rare-earth-based BR, for example, those manufactured by LANXESS and the like can be used.

Examples of the SPB-containing BR include those in which 1,2-syndiotactic polybutadiene crystal is chemically bonded with BR and dispersed, but not those in which the crystal is simply dispersed in the BR. As such SPB-containing BR, those manufactured by Ube Industries, Ltd. and the like can be used.

As a modified BR, a terminal-modified BR coupled with tin and a terminal-modified BR having an alkoxysilyl group and/or an amino group are appropriately used. Moreover, the modified BR may be either non-hydrogenated or hydrogenated. As such modified BR, those manufactured by Zeon Corporation, those manufactured by Asahi Kasei Chemicals Co., Ltd., and the like can be used.

As the modified BR coupled with tin, those obtained by adding a tin compound after polymerizing 1,3-butadiene by a lithium initiator, and further in which the end of the modified BR molecule is bonded by tin-carbon bond are preferable. Examples of the lithium initiator include lithium-based compounds such as alkyllithium, aryllithium, vinyllithium, organic tin lithium, and organic nitrogen lithium compounds, lithium metals, and the like. By using the above-described lithium initiator as an initiator for a modified BR, a modified BR having a high vinyl content and a low cis content can be produced. Examples of the tin compound include tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, p-tributyltin styrene, and the like, which may be used alone, or two or more thereof may be used in combination.

The BRs listed above may be used alone, or two or more thereof may be used in combination.

A weight-average molecular weight (Mw) of the BR is preferably 300,000 or more, more preferably 350,000 or more, further preferably 400,000 or more, from the viewpoints of abrasion resistance and grip performance, etc. Moreover, it is preferably 2,000,000 or less, more preferably 1,000,000 or less, from the viewpoints of cross-linking uniformity, etc. Besides, the Mw can be calculated in terms of a standard polystyrene based on measurement values obtained by a gel permeation chromatography (GPC) (GPC-8000 Series manufactured by Tosoh Corporation, detector: differential refractometer, column: TSKGEL SUPERMULTIPORE HZ-M manufactured by Tosoh Corporation).

A content of the BR when compounded in the rubber component is preferably 5% by mass or more, more preferably 10% by mass or more, further preferably 12% by mass or more, particularly preferably 15% by mass or more, from the viewpoint of fuel efficiency. Moreover, the content is preferably 28% by mass or less, more preferably 25% by mass or less, further preferably 22% by mass or less, particularly preferably 20% by mass or less, from the viewpoint of breaking strength.

(SBR)

The SBR is not particularly limited, examples of which include a solution-polymerized SBR (S-SBR), an emulsion-polymerized SBR (E-SBR), modified SBRs (a modified S-SBR, a modified E-SBR) thereof, and the like. Examples of the modified SBR include a SBR modified at its terminal and/or main chain, a modified SBR coupled with tin, a silicon compound, etc. (a modified SBR of condensate or having a branched structure, etc.), and the like. Among them, an E-SBR is preferable from the viewpoint that it can well improve fuel efficiency and abrasion resistance. These SBRs may be used alone, or two or more thereof may be used in combination.

A content of the SBR in the rubber component when compounded can be, but not particularly limited to, for example, 1% by mass or more, 5% by mass or more, 10% by mass or more, 30% by mass or less, 25% by mass or less, or 20% by mass or less.

(Other Rubber Components)

As the rubber components according to the present disclosure, rubber components other than the above-described isoprene-based rubbers, SBRs, and BRs may be included. As other rubber components, cross-linkable rubber components commonly used in the tire industry can be used, such as, for example, a styrene-isoprene-butadiene copolymer rubber (SIBR), a styrene-isobutylene-styrene block copolymer (SIBS), a chloroprene rubber (CR), an acrylonitrile-butadiene rubber (NBR), a hydrogenated nitrile rubber (HNBR), a butyl rubber (IIR), an ethylene propylene rubber, a polynorbornene rubber, a silicone rubber, a polyethylene chloride rubber, a fluororubber (FKM), an acrylic rubber (ACM), a hydrin rubber, and the like. These other rubber components may be used alone, or two or more thereof may be used in combination.

<Filler>

The rubber composition for tread according to the present disclosure preferably comprises a filler comprising carbon black and/or silica. Moreover, the filler may be a filler consisting only of carbon black or a filler consisting only of carbon black and silica.

(Silica)

By compounding silica in the rubber composition for tread according to the present disclosure, fuel efficiency, breaking resistance, and abrasion resistance can be improved. Silica is not particularly limited, and those common in the tire industry can be used, such as, for example, silica prepared by a dry process (anhydrous silica) and silica prepared by a wet process (hydrous silica). Among them, hydrous silica prepared by a wet process is preferable from the reason that it has many silanol groups. These silica may be used alone, or two or more thereof may be used in combination.

An average particle size of silica is preferably 50 nm or less, more preferably 40 nm or less, further preferably 30 nm or less. The average particle size of silica is preferably 13 nm or more, more preferably 15 nm or more, further preferably 17 nm or more. When the average particle size of silica is within the above-described ranges, the effects of the present disclosure tend to be better exhibited. Besides, the average particle size of silica is a number average particle size and is measured as an average value for any 100 particles with a transmission electron microscope.

A cetyltrimethylammonium bromide (CTAB) specific surface area of silica is preferably 80 $m^2/g$ or more, more preferably 90 $m^2/g$ or more, further preferably 100 $m^2/g$ or more. Moreover, the CTAB specific surface area of silica is more preferably 300 $m^2/g$ or less, more preferably 170 $m^2/g$ or less, further preferably 150 $m^2/g$ or less. When the CTAB specific surface area of silica is within the above-described ranges, the effects of the present disclosure tend to be better exhibited. Besides, the CTAB specific surface area of silica in the present specification is a value measured according to ASTM D3765-92.

A nitrogen adsorption specific surface area ($N_2SA$) of silica is preferably 80 $m^2/g$ or more, more preferably 110 $m^2/g$ or more, further preferably 140 $m^2/g$ or more, particularly preferably 170 $m^2/g$ or more. Moreover, the $N_2SA$ of silica is preferably 350 $m^2/g$ or less, more preferably 300 $m^2/g$ or less, further preferably 250 $m^2/g$ or less. When the $N_2SA$ of silica is within the above-described ranges, the effects of the present disclosure tend to be better exhibited. Besides, the $N_2SA$ of silica in the present specification is a value measured by a BET method according to ASTM D3037-93.

A content of silica based on 100 parts by mass of the rubber component is preferably 20 parts by mass or less, more preferably 18 parts by mass or less, further preferably 15 parts by mass, particularly preferably 10 parts by mass or less, from the viewpoint of fuel efficiency. On the other hand, the content is preferably 1 part by mass or more, more preferably 3 parts by mass or more, further preferably 5 parts by mass or more, from the viewpoint of elongation at break.

(Carbon Black)

Carbon black is not particularly limited, and, for example, those commonly used in the tire industry such as GPF, FEF, HAF, ISAF, and SAF can be used. These carbon black may be used alone, or two or more thereof may be used in combination.

An average particle size of carbon black is preferably 90 nm or less, more preferably 70 nm or less, further preferably 50 nm or less. Moreover, the average particle size of carbon black is preferably 13 nm or more, more preferably 15 nm or more, further preferably 17 nm or more. When the average particle size of carbon black is within the above-described ranges, the effects of the present disclosure tend to be better exhibited. Besides, the average particle size of carbon black is a number average particle size and is measured as an average value for any 100 particles with a transmission electron microscope.

A cetyltrimethylammonium bromide (CTAB) specific surface area of carbon black is preferably 80 $m^2/g$ or more, more preferably 90 $m^2/g$ or more, further preferably 100 $m^2/g$ or more. Moreover, the CTAB specific surface area of carbon black is more preferably 170 m²/g or less, more preferably 165 m²/g or less, further preferably 160 m²/g or less. When the CTAB specific surface area of carbon black is within the above-described ranges, the effects of the present disclosure tend to be better exhibited. Besides, the CTAB specific surface area of carbon black in the present specification is a value measured in accordance with JIS K 6217-3: 2001.

A nitrogen adsorption specific surface area ($N_2SA$) of carbon black is preferably 40 m²/g or more, more preferably 60 m²/g or more, further preferably 80 m²/g or more, from the viewpoint of breaking strength. Moreover, it is preferably 200 m²/g or less, more preferably 150 m²/g or less, further preferably 130 m²/g or less, from the viewpoint of processability. Besides, the $N_2SA$ of carbon black in the present specification is a value measured according to JIS K 6217-2: "Carbon black for rubber industry-Fundamental characteristics-Part 2: Determination of specific surface area-Nitrogen adsorption methods-Single-point procedures" A Method.

A content of carbon black based on 100 parts by mass of the rubber component is preferably 20 parts by mass or more, more preferably 25 parts by mass or more, further preferably 30 parts by mass or more, from the viewpoint of fuel efficiency. Moreover, the content is preferably 60 parts by mass or less, more preferably 55 parts by mass or less, further preferably 50 parts by mass or less, particularly preferably 45 parts by mass or less, from the viewpoint of fuel efficiency.

As fillers other than silica and carbon black, those commonly used in the tire industry such as, for example, aluminum hydroxide, calcium carbonate, alumina, clay, and talc, can be used.

A content of silica in 100% by mass of silica and carbon black in total is preferably 1% by mass or more, more preferably 3% by mass or more, further preferably 5% by mass or more, particularly preferably 7% by mass or more. Moreover, the content of silica is preferably 50% by mass or less, more preferably 40% by mass or less, further preferably 30% by mass or less.

A total content of silica and carbon black based on 100 parts by mass of the rubber component is preferably 25 parts by mass or more, more preferably 30 parts by mass or more, further preferably 35 parts by mass or more, from the viewpoint of abrasion resistance. Moreover, it is preferably 80 parts by mass or less, more preferably 70 parts by mass or less, further preferably 60 parts by mass or less, particularly preferably 55 parts by mass or less, from the viewpoint of suppressing deterioration of fuel efficiency and abrasion resistance.

(Silane Coupling Agent)

Silica is preferably used in combination with a silane coupling agent. Examples of the silane coupling agents include, but not particularly limited to, for example, silane coupling agents having a sulfide group such as bis(3-triethoxysilylpropyl)disulfide and bis(3-triethoxysilylpropyl)tetrasulfide; silane coupling agents having a mercapto group such as 3-mercaptopropyltrimethoxysilane, NXT-Z100, NXT-Z45, and NXT manufactured by Momentive Performance Materials; silane coupling agents having a vinyl group such as vinyltriethoxysilane and vinyltrimethoxysilane; silane coupling agents having an amino group such as 3-aminopropyltriethoxysilane, 3-aminopropyltrimethoxysilane, and 3-(2-aminoethyl)aminopropyltriethoxysilane; glycidoxy-based silane coupling agents such as γ-glycidoxypropyltriethoxysilane and γ-glycidoxypropyltrimethoxysilane; nitro-based silane coupling agents such as 3-nitropropyltrimethoxysilane and 3-nitropropyltriethoxysilane; chloro-based silane coupling agents such as 3-chloropropyltrimethoxysilane and 3-chloropropyltriethoxy, and the like. Among them, silane coupling agents having a sulfide group are preferable. These silane coupling agents may be used alone, or two or more thereof may be used in combination.

A content of the silane coupling agent when compounded based on 100 parts by mass of silica is preferably 8.0 parts by mass or more, more preferably 8.5 parts by mass or more, further preferably 9.0 parts by mass or more, particularly preferably 9.5 parts by mass or more, from the viewpoint of enhancing dispersibility of silica. Moreover, it is preferably 18 parts by mass or less, more preferably 16 parts by mass or less, further preferably 14 parts by mass or less, particularly preferably 12 parts by mass or less, from the viewpoint of preventing deterioration of abrasion resistance.

(Other Compounding Agents)

The rubber composition for tread according to the present disclosure can appropriately comprise compounding agents commonly used in the conventional tire industry, such as, for example, oil, wax, a glycerin fatty acid ester, processing aid, an antioxidant, stearic acid, zinc oxide, a vulcanizing agent such as sulfur, and a vulcanization accelerator, in addition to the above-described components.

Examples of oil include, for example, process oil, vegetable fats and oils, animal fats and oils, and the like. Examples of the process oil include a paraffin-based process oil, a naphthene-based process oil, an aroma-based process oil, and the like. In addition, as an environmental measure, process oil having a low content of a polycyclic aromatic (PCA) compound can also be used. Examples of the low PCA content process oil include a mild extraction solution (MES), a treated distillate aromatic extract (TDAE), a heavy naphthenic oil, and the like.

When the rubber composition comprises the oil, the content thereof is, from the viewpoint of a balance of fuel efficiency and breaking strength, preferably 10 parts by mass or less, more preferably 7 parts by mass or less, further preferably 4 parts by mass or less based on 100 parts by mass of the rubber component. Besides, in the present specification, the content of oil also includes an amount of oil contained in an oil-extended rubber.

When the rubber composition comprises wax, the content thereof is, from the viewpoint of weather resistance of a rubber, preferably 0.5 parts by mass or more, more preferably 1.0 part by mass or more, further preferably 1.5 parts by mass or more based on 100 parts by mass of the rubber component. Moreover, it is preferably 8.0 parts by mass or less, more preferably 6.0 parts by mass or less, from the viewpoint of preventing whitening of a tire due to bloom.

The glycerin fatty acid ester is one in which a fatty acid is ester-bonded to at least one of three OH groups of glycerin, and is referred to as a glycerin fatty acid monoester, a glycerin fatty acid diester, or a glycerin fatty acid triester depending on the number of fatty acids attached thereto. The fatty acid of the glycerin fatty acid ester is preferably a fatty acid having 8 to 28 carbon atoms, more preferably 8 to 22 carbon atoms, further preferably 10 to 18 carbon atoms, particularly preferably 12 to 18 carbon atoms. Moreover, the fatty acid may be saturated, unsaturated, linear, or branched, but a linear saturated fatty acid is preferable. Specific examples of the fatty acid include capric acid, lauric acid, myristic acid, palmitic acid, stearic acid, isostearic acid, oleic acid, linoleic acid, and the like.

When the rubber composition comprises the glycerin fatty acid ester, the content thereof is, but not particularly limited to, preferably 0.1 parts by mass or more, more preferably 0.5 parts by mass or more, further preferably 1.0 part by mass or more based on 100 parts by mass of the rubber component. Moreover, the content is preferably 10.0 parts by mass or less, more preferably 8.0 parts by mass or less, further preferably 6.0 parts by mass or less. When the content of the glycerin fatty acid ester is within the above-described ranges, dispersibility of a filler in the rubber composition can be improved, and fuel efficiency and abrasion resistance can be further improved.

Examples of processing aid include, for example, a fatty acid metal salt, a fatty acid amide, an amide ester, a silica surface active agent, a fatty acid ester, a mixture of a fatty acid metal salt and an amide ester, a mixture of a fatty acid metal salt and a fatty acid amide, and the like. These processing aid may be used alone, or two or more thereof may be used in combination. As processing aid, for example, those commercially available from Schill+Seilacher GmbH, Performance Additives, etc. can be used.

When the rubber composition comprises the processing aid, the content thereof is, from the viewpoint of exhibiting an effect of improving processability, preferably 0.5 parts by mass or more, more preferably 1 part by mass or more based on 100 parts by mass of the rubber component. Moreover, it is preferably 10 parts by mass or less, more preferably 8 parts by mass or less, from the viewpoints of abrasion resistance and breaking strength.

Examples of the antioxidant include, but not particularly limited to, for example, amine-based, quinoline-based, quinone-based, phenol-based and imidazole-based compounds, and a carbamic acid metal salt, preferably, phenylenediamine-based antioxidants such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, and quinoline-based antioxidants such as 2,2,4-trimethyl-1,2-dihydroquinoline polymer and 6-ethoxy-2,2,4-trimethyl-1,2-dihydroquinoline. These antioxidants may be used alone, or two or more thereof may be used in combination.

When the rubber composition comprises the antioxidant, the content thereof is, from the viewpoint of ozone crack resistance of a rubber, preferably 0.5 parts by mass or more, more preferably 1.0 part by mass or more, further preferably 1.5 parts by mass or more based on 100 parts by mass of the rubber component. Moreover, it is preferably 10.0 parts by mass or less, more preferably 5.0 parts by mass or less, from the viewpoints of abrasion resistance and wet grip performance.

When the rubber composition comprises stearic acid, the content thereof is, from the viewpoint of processability, preferably 0.5 parts by mass or more, more preferably 1 part by mass or more based on 100 parts by mass of the rubber component. Moreover, it is preferably 10 parts by mass or less, more preferably 5 parts by mass or less, from the viewpoint of vulcanization rate.

When the rubber composition comprises zinc oxide, the content thereof is, from the viewpoint of processability, preferably 0.5 parts by mass or more, more preferably 1.0 part by mass or more, further preferably 1.5 parts by mass or more based on 100 parts by mass of the rubber component. Moreover, it is preferably 10.0 parts by mass or less, more preferably 5.0 parts by mass or less, from the viewpoint of abrasion resistance.

Sulfur is appropriately used as a vulcanizing agent. As sulfur, a powdery sulfur, oil a processing sulfur, a precipitated sulfur, a colloidal sulfur, an insoluble sulfur, a highly dispersible sulfur, and the like can be used.

When the rubber composition comprises the sulfur as a vulcanizing agent, the content thereof is, from the viewpoints of securing a sufficient vulcanization reaction and obtaining good grip performance and abrasion resistance, preferably 0.5 parts by mass or more, more preferably 1.0 part by mass or more based on 100 parts by mass of the rubber component. Moreover, it is preferably 3.0 parts by mass or less, more preferably 2.5 parts by mass or less, further preferably 2.0 parts by mass or less, from the viewpoint of deterioration. Besides, a content of the vulcanizing agent when an oil-containing sulfur is used as the vulcanizing agent shall be a total content of pure sulfur comprised in the oil-containing sulfur.

Examples of vulcanizing agents other than sulfur include, for example, an alkylphenol-sulfur chloride condensate, sodium hexamethylene-1,6-bisthiosulfate dihydrate, 1,6-bis (N,N'-dibenzylthiocarbamoyldithio)hexane, and the like. As these vulcanizing agents other than sulfur, those commercially available from Taoka Chemical Co., Ltd., LANXESS, Flexsys, etc. can be used.

Examples of the vulcanization accelerator include, for example, sulfenamide-based, thiazole-based, thiuram-based, thiourea-based, guanidine-based, dithiocarbamic acid-based, aldehyde-amine-based or aldehyde-ammonia-based, imidazoline-based, and xantate-based vulcanization accelerators, and the like. These vulcanization accelerators may be used alone, or two or more thereof may be used in combination. Among them, one or more vulcanization accelerators selected from the group consisting of sulfenamide-based, guanidine-based, and thiazole-based vulcanization accelerators are preferable.

Examples of the sulfenamide-based vulcanization accelerator include, for example, N-tert-butyl-2-benzothiazolylsulfenamide (TBBS), N-cyclohexyl-2-benzothiazolylsulfenamide (CBS), N,N-dicyclohexyl-2-benzothiazolylsulfenamide (DCBS), and the like. Among them, N-tert-butyl-2-benzothiazolylsulfenamide (TBBS) is preferable.

Examples of the guanidine-based vulcanization accelerator include, for example, 1,3-diphenylguanidine (DPG), 1,3-di-o-tolylguanidine, 1-o-tolvlbiguanide, di-o-tolylguanidine salt of dicatecholborate, 1,3-di-o-cumenylguanidine, 1,3-di-o-biphenylguanidine, 1,3-di-o-cumenyl-2-propionylguanidine, and the like. Among them, 1,3-diphenylguanidine (DPG) is preferable.

Examples of the thiazole-based vulcanization accelerator include, for example, 2-mercaptobenzothiazole, a cyclohexylamine salt of 2-mercaptobenzothiazole, di-2-benzothiazolyl disulfide, and the like. Among them, 2-mercaptobenzothiazole is preferable.

When the rubber composition comprises the vulcanization accelerator, the content thereof is preferably 1 part by mass or more, more preferably 2 parts by mass or more based on 100 parts by mass of the rubber component. Moreover, the content of the vulcanization accelerator based on 100 parts by mass of the rubber component is preferably 8 parts by mass or less, more preferably 7 parts by mass or less, further preferably 6 parts by mass or less. When the content of the vulcanization accelerator is within the above-described ranges, breaking strength and elongation tend to be secured.

The rubber composition according to the present disclosure can be produced by a known method. For example, it can be produced by kneading each of the above-described components using a rubber kneading apparatus such as an open roll and a closed type kneader (Bunbury mixer, kneader, etc.).

The kneading step includes, for example, a base kneading step of kneading compounding agents and additives other than vulcanizing agents and vulcanization accelerators and a final kneading (F kneading) step of adding vulcanizing agents and vulcanization accelerators to the kneaded product obtained by the base kneading step and kneading them. Furthermore, the base kneading step can be divided into a plurality of steps, if desired.

The kneading condition is not particularly limited. Examples of kneading include, in the base kneading step, a method of kneading at a discharge temperature at 150 to 170° C. for 3 to 10 minutes, and in the final kneading step, a method of kneading at 70 to 110° C. for 1 to 5 minutes. The vulcanization condition is not particularly limited. Examples of vulcanization include a method of vulcanizing at 150 to 200° C. for 10 to 30 minutes.

A tire comprising a tread comprising a cap rubber layer and a base rubber layer can be produced by a usual method using the above-described rubber composition. That is, the tire can be produced by extruding an unvulcanized rubber composition, obtained by compounding each of the above-described components based on the rubber component as necessary, into a shape of the cap rubber layer and the base rubber layer with an extruder equipped with a mouthpiece having a predetermined shape, attaching it together with other tire members on a tire molding machine, and molding them by a usual method to form an unvulcanized tire, followed by heating and pressurizing this unvulcanized tire in a vulcanizing machine.

EXAMPLE

Hereinafter, the present disclosure will be described based on Examples, though the present disclosure is not limited to these Examples.

Various chemicals used in Examples and Comparative examples are collectively shown below.

NR: TSR20
BR1: UBEPOL BR150B manufactured by Ube Industries, Ltd. (non-modified BR, cis content: 97% by mass, Mw: 440,000)
BR2: BR1250H manufactured by Zeon Corporation (tin-modified BR, polymerized using lithium as an initiator, cis content: 42% by mass, Mw: 570,000)
Carbon black 1: Carbon black produced according to Production example 1 below (average particle size: 19 nm, CTAB: 150 m$^2$/g, N$_2$SA: 155 m$^2$/g)
Carbon Black 2: DIABLACK N330 manufactured by Mitsubishi Chemical Corporation (average particle size: 31 nm, CTAB: 78 m$^2$/g, N$_2$SA: 79 m$^2$/g)
Carbon Black 3: DIABLACK N220 manufactured by Mitsubishi Chemical Corporation (average particle size: 23 nm, CTAB: 110 m$^2$/g, N$_2$SA: 114 m$^2$/g)
Silica: Ultrasil VN3 manufactured by Evonik Degussa GmbH (average particle size: 18 nm, CTAB: 153 m$^2$/g, N$_2$SA: 175 m$^2$/g)
Wax: OZOACE 0355 manufactured by Nippon Seiro Co., Ltd.
Antioxidant 1: Nocrac 6C manufactured by Ouchi Shinko Chemical Industry Co., Ltd. (N-(1,3-dimethylbutyl)-N'-phenyl-p-phenylenediamine)
Antioxidant 2: Nocrac RD manufactured by Ouchi Shinko Chemical Industry Co., Ltd. (poly(2,2,4-trimethyl-1,2-dihydroquinoline))
Stearic acid: Bead stearic acid "CAMELLIA" manufactured by NOF CORPORATION
Zinc oxide: Zinc oxide No. 1 manufactured by Mitsui Mining & Smelting Co., Ltd.
Sulfur 1: HK-200-5 manufactured by Hosoi Chemical Industry Co., Ltd. (5% oil-containing powdered sulfur)
Sulfur 2: Seimi OT manufactured by Nippon Kanryu Industry Co., Ltd. (10% oil-containing insoluble sulfur)
Vulcanization accelerator: Nocceler NS manufactured by Ouchi Shinko Chemical Industry Co., Ltd. (N-tert-butyl-2-benzothiazolylsulfenamide (TBBS))

Production Example 1

Using a carbon black reactor, having a combustion zone, a raw material introduction zone, and a rear reaction zone sequentially joined, the combustion zone equipped with an air introduction duct and a combustion burner and having an inner diameter of 800 mm and a length of 1600 mm, the raw material introduction zone connected from the combustion zone and consisting of a narrow diameter part with an inner diameter of 175 mm and a length of 1000 mm though which a raw material nozzle connected from a periphery, and the rear reaction zone equipped with a quenching apparatus having an inner diameter of 400 mm and a length of 3000 mm, carbon black 1 was produced using a C heavy oil for fuel and a creosote oil for a raw material hydrocarbon with each condition set.

Examples and Comparative Examples

According to the compounding formulations shown in Tables 1 and 2, using a 1.7 L closed Banbury mixer, all chemicals other than sulfur and vulcanization accelerators were kneaded until reaching a discharge temperature at 170° C. for 5 minutes to obtain a kneaded product. Furthermore, the obtained kneaded product was kneaded again (remilled) with the above-described Banbury mixer at a discharge temperature of 150° C. for 4 minutes. Next, using a twin-screw open roll, sulfur and vulcanization accelerators were added to the obtained kneaded product, and the mixture was kneaded for 4 minutes until the temperature reached 105° C. to obtain an unvulcanized rubber composition. The obtained unvulcanized rubber composition was press-vulcanized at 170° C. for 12 minutes to produce a test vulcanized rubber composition.

Moreover, the above-described unvulcanized rubber composition was extruded into a shape of each of a cap rubber layer and a base rubber layer tire with an extruder equipped with a mouthpiece having a predetermined shape and attached together with other tire members, forming an unvulcanized tire, and the unvulcanized tire was press-vulcanized to produce a test tire (12R22.5, a tire for truck/bus) described in Table 3.

The obtained test vulcanized rubber composition and test tire were evaluated as follows. The evaluation results are shown in Tables 1 to 3.

<Measurement of Acetone Extraction Amount (AE Amount)>

Each rubber test piece prepared from vulcanized rubber compositions B1 to B12 for the base rubber layer was immersed in acetone for 24 hours to extract a soluble component. A mass of each test piece before and after extraction was measured, and an acetone extraction amount was determined by the following equation.

Acetone extraction amount (%)={(mass of rubber test piece before extraction−mass of rubber test piece after extraction)/(mass of rubber test piece before extraction)}×100

<Viscoelasticity Test>

With the vulcanized rubber compositions B1 to B12 for the base rubber layer prepared as sheet-shaped vulcanized rubber test pieces, using a viscoelastic spectrometer RSA-G2 manufactured by TA Instruments, in accordance with JIS K 6394: 2007, a loss tangent (tan δ) was measured at a temperature of 70° C. with an initial strain of 5%, a dynamic strain of ±1%, and a frequency of 10 Hz. Moreover, an inverse value of 70° C. tan δ of the base rubber layer was indicated as an index with Comparative example 1 being 100 (a fuel efficiency index). The results show that the larger the index is, the better the fuel efficiency is.

(Fuel efficiency index)=(70° C. tan δ of base rubber layer in Comparative example 1)/(70° C. tan δ of base rubber layer of each test tire)×100

<Tensile Test>

Dumbbell-shaped No. 7 test pieces were prepared from the vulcanized rubber composition A1 for the cap rubber layer and the vulcanized rubber compositions B1 to B12 for the base rubber layer, respectively. In accordance with JIS K 6251: 2017, a tensile test was conducted under a condition of a tensile speed at 3.3 mm/sec in an atmosphere of 23° C. to measure a modulus at 200% elongation (MPa) and a strength at break (TB) (MPa), and an elongation at break (EB) (%).

<Durability Test>

Figure 3:
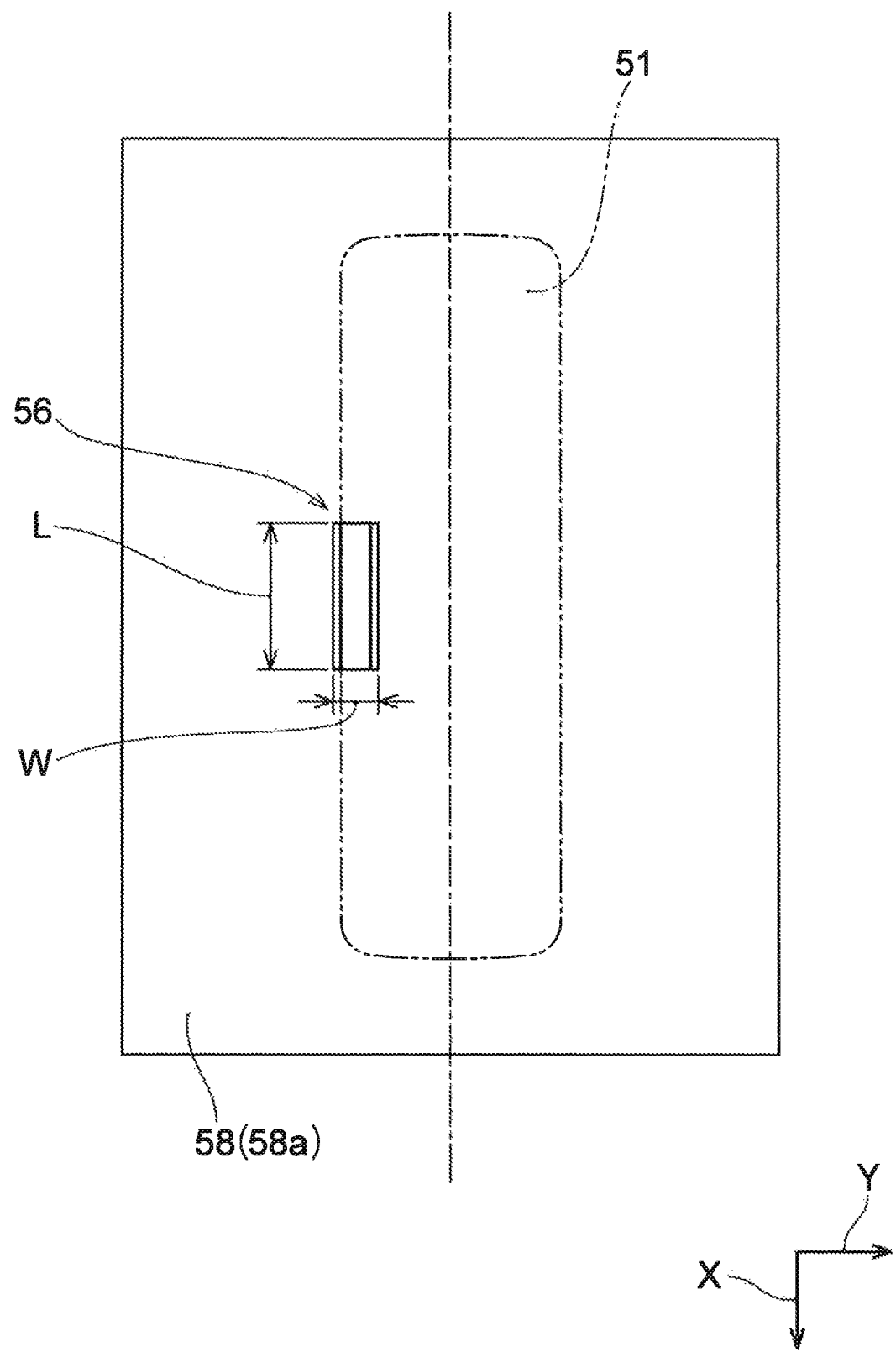
FIG. 3 is a plan view of a protrusion jig and a reference surface of the test device.
Figure 4:
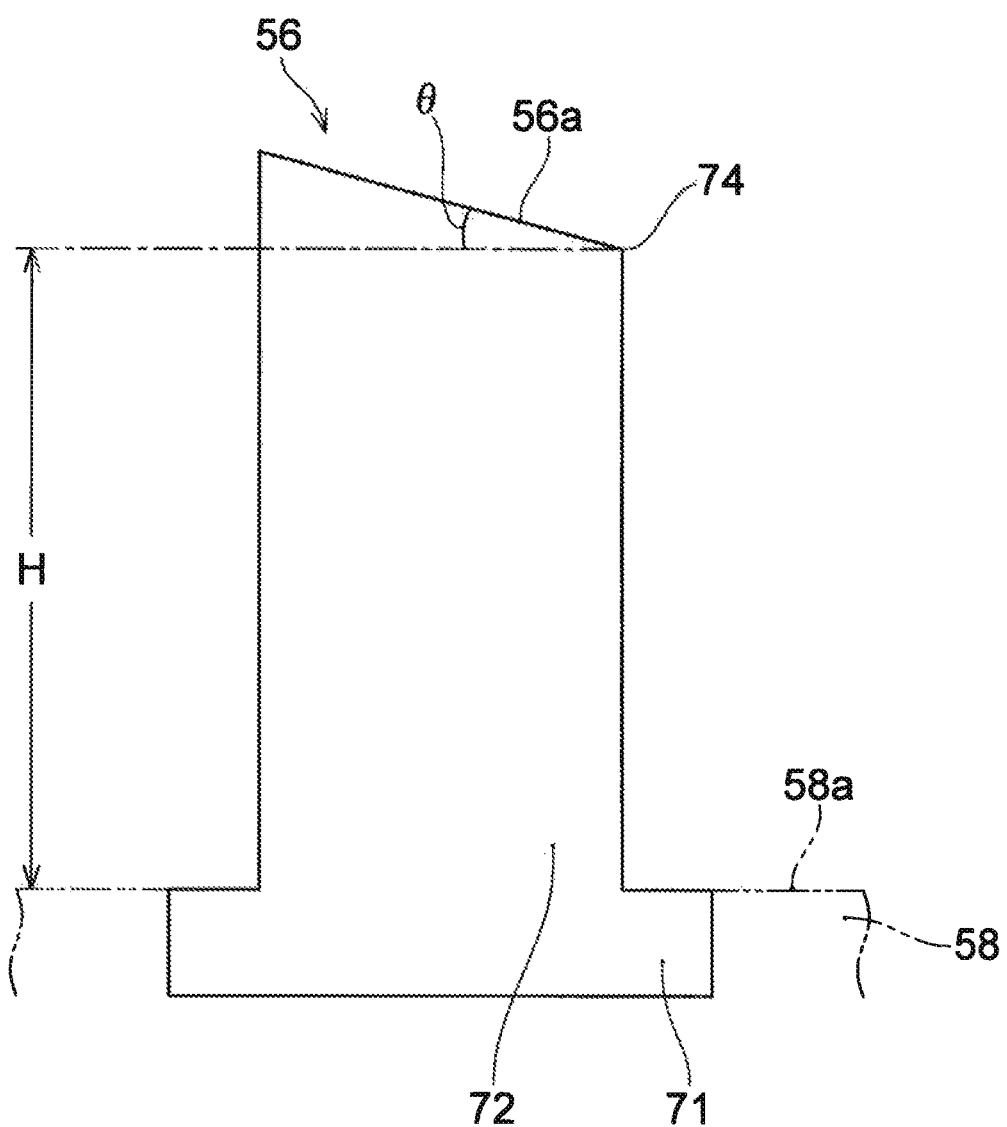
FIG. 4 is an enlarged view of a main part of the test device.

A rib tear resistance of each test tire was evaluated using a test device 52 shown in FIG. 2 and described in JP 2020-26257 A. FIG. 3 is a plan view of a protrusion jig and a reference surface of the test device 52. A protrusion jig 56 was prepared which has an external shape shown in FIG. 4, is made of steel, and has a length L of an upper surface 56a of 200 mm, a width W of 50 mm, a height H of a protrusion part 72 of 150 mm, and an inclination angle θ of the upper surface 56a at 3°. This protrusion jig 56 was mounted to a base member 58 of the test device 52.

(1) Tire Assembly

Each test tire was incorporated into a standardized rim to form a tire assembly 51.

(2) Preprocessing Step

The tire assembly 51 was placed in a dry heat oven at a temperature of 90° C. and heated for 10 days. Then, the tire assembly 51 was taken out of the oven and returned to room temperature.

(3) Processing Step

The preprocessed tire assembly 51 was mounted to the test device 52. At this time, the tire assembly 51 and the protrusion jig 56 were aligned with each other so that only a shoulder rib (not shown) (a rib formed between a circumferential groove on the outermost side in a tire axial direction and a tread grounding end) of the tread part 1 is in contact with the upper surface 56a of the protrusion jig 56. Then, the tire assembly 51 (an axis 66) was lowered at a speed of 50.0 mm/min, which was continued until each test tire slipped off from the protrusion jig 56.

(4) Evaluation Step

The tire assembly 51 that had completed the processing step was removed from the test device 52 and pressed against a protrusion jig 56 of a tire 2 to visually observe the pressed part. Tires for which rib tears were not confirmed were indicated as +, and tires for which rib tears were confirmed were indicated as "−"

TABLE 1

| Compounding amount (part by mass) | Cap rubber layer A1 |
|---|---|
| NR | 70 |
| BR1 | 30 |
| Carbon black 1 | 5.0 |
| Carbon black 3 | 55 |
| Wax | 1.5 |
| Antioxidant 1 | 2.0 |
| Antioxidant 2 | 0.5 |
| Stearic acid | 4.0 |
| Zinc oxide | 3.0 |
| Sulfur 1 | 1.0 |
| Vulcanization accelerator | 1.5 |
| M200c (MPa) | 10 |

TABLE 2

| Compounding amount (part by mass) | B1 | B2 | B3 | B4 | B5 | B6 | B7 | B8 | B9 | B10 | B11 | B12 |
|---|---|---|---|---|---|---|---|---|---|---|---|---|
| NR | 100 | 100 | 100 | 85 | 65 | 100 | 100 | 100 | 100 | 100 | 100 | 85 |
| BR1 | — | — | — | 15 | — | — | — | — | — | — | — | 15 |
| BR2 | — | — | — | — | 35 | — | — | — | — | — | — | — |
| Carbon black 2 | 47 | 35 | 40 | 44 | 44 | 38 | 40 | 43 | 32 | 35 | 30 | 44 |
| Carbon black 3 | — | — | — | — | — | — | — | 10 | — | — | 10 | — |
| Silica | — | — | — | 5.0 | 5.0 | 5.0 | 5.0 | 5.0 | 10.0 | 10.0 | 5.0 | 5.0 |
| Antioxidant 1 | 1.0 | 1.0 | 1.0 | 1.0 | 1.0 | 1.0 | 1.0 | 1.0 | 1.0 | 1.0 | 1.0 | 1.0 |
| Antioxidant 2 | 0.5 | 0.5 | 0.5 | 0.5 | 0.5 | 0.5 | 0.5 | 0.5 | 0.5 | 0.5 | 0.5 | 0.5 |
| Stearic acid | 2.0 | 2.0 | 2.0 | 2.0 | 2.0 | 2.0 | 2.0 | 2.0 | 2.0 | 2.0 | 2.0 | 2.0 |
| Zinc oxide | 3.5 | 3.5 | 3.5 | 3.5 | 3.5 | 3.5 | 3.5 | 3.5 | 3.5 | 3.5 | 3.5 | 3.5 |
| Sulfur 2 | 2.8 | 2.0 | 2.4 | 2.4 | 2.4 | 2.0 | 2.0 | 2.3 | 2.3 | 2.3 | 2.3 | 2.4 |
| Vulcanization accelerator | 1.0 | 1.0 | 1.0 | 1.0 | 1.0 | 1.0 | 1.0 | 1.0 | 1.0 | 1.0 | 1.0 | 1.0 |
| Acetone extraction amount (%) | 3.8 | 4.1 | 4.0 | 3.6 | 3.4 | 3.9 | 3.8 | 3.8 | 3.9 | 3.9 | 3.9 | 3.6 |
| M200b (MPa) | 12 | 4 | 7 | 4 | 3 | 6 | 7 | 8 | 5 | 6 | 7 | 5 |
| 70° C. tan δ | 0.042 | 0.030 | 0.046 | 0.035 | 0.030 | 0.035 | 0.037 | 0.039 | 0.035 | 0.039 | 0.036 | 0.034 |
| (TB × EB/70° C. tan δ)/$10^5$ | 3.3 | 5.2 | 4.8 | 3.5 | 2.8 | 4.5 | 4.9 | 4.5 | 5.5 | 5.3 | 4.8 | 5.5 |

TABLE 3

| | Comparative example | | | | | Example | | | | | | | |
|---|---|---|---|---|---|---|---|---|---|---|---|---|---|
| | 1 | 2 | 3 | 4 | 5 | 1 | 2 | 3 | 4 | 5 | 6 | 7 | 8 |
| Cap rubber layer | A1 | A1 | A1 | A1 | A1 | A1 | A1 | A1 | A1 | A1 | A1 | A1 | A1 |
| Base rubber layer | B1 | B2 | B3 | B4 | B5 | B6 | B7 | B8 | B9 | B10 | B11 | B12 | B6 |
| Acetone extraction amount (%) | 3.8 | 4.1 | 4.0 | 3.6 | 3.4 | 3.9 | 3.8 | 3.8 | 3.9 | 3.9 | 3.9 | 3.6 | 3.9 |
| M200c – M200b | −2 | 6 | 3 | 6 | 7 | 4 | 3 | 2 | 5 | 4 | 3 | 5 | 4 |
| 70° C. tan δ | 0.042 | 0.030 | 0.046 | 0.035 | 0.030 | 0.035 | 0.037 | 0.039 | 0.035 | 0.039 | 0.036 | 0.034 | 0.035 |
| (TB × EB/70° C. tan δ)/$10^5$ | 3.3 | 5.2 | 4.8 | 3.5 | 2.8 | 4.5 | 4.9 | 4.5 | 5.5 | 5.3 | 4.8 | 5.5 | 4.5 |
| w/W (%) Index | 25 | 25 | 25 | 25 | 25 | 25 | 25 | 25 | 25 | 25 | 25 | 25 | 15 |
| Fuel efficiency | 100 | 140 | 91 | 120 | 140 | 120 | 114 | 108 | 120 | 108 | 117 | 124 | 120 |
| Rib tear resistance | − | − | + | − | − | + | + | + | + | + | + | + | + |

From the results in Tables 1 to 3, it can be found that the pneumatic tire for heavy load of the present disclosure, in which a difference in modulus at 200% elongation between a base rubber layer and a cap rubber layer is set within a predetermined range and an acetone extraction amount of the base rubber layer is set within a predetermined range, has improved fuel efficiency and rib tear resistance.

Embodiments

Examples of embodiments of the present disclosure are shown below.

[1] A pneumatic tire for heavy load comprising a tread, the tread having a cap rubber layer of a tread surface and a base rubber layer adjacent to inside in a tire radial direction of the cap rubber layer, the cap rubber layer and the base rubber layer being composed of a rubber composition comprising a rubber component, wherein an acetone extraction amount of the rubber composition of the base rubber layer is less than 4.0% by mass (preferably less than 3.9% by mass, more preferably less than 3.8% by mass), and wherein, where a modulus at 200% elongation at 23° C. of the rubber composition of the base rubber layer is defined as M200b (MPa) and a modulus at 200% elongation at 23° C. of the rubber composition of the cap rubber layer is defined as M200c (MPa), M200b and M200c satisfy the following inequality (1):

$$0 \leq M200c - M200b \leq 5 \quad (1)$$

[2] The pneumatic tire for heavy load of [1] above, wherein a tan δ at 70° C. (70° C. tan δ) of the rubber composition of the base rubber layer is less than 0.040 (preferably less than 0.039, more preferably less than 0.038, further preferably less than 0.037).

[3] The pneumatic tire for heavy load of [1] or [2] above, wherein, when a strength at break at 23° C. of the rubber composition of the base rubber layer is defined as TB (MPa) and an elongation at break at 23° C. is defined as EB (%), the tan δ at 70° C. (70° C. tan δ) of the rubber composition of the base rubber layer, TB and EB satisfy the following inequality (2):

$$TB \times EB/70° C. \tan \delta \geq 4.5 \times 10^5 \quad (2)$$

[4] The pneumatic tire for heavy load of any one of [1] to [3] above, wherein the rubber component of the base rubber layer comprises a butadiene rubber.

[5] The pneumatic tire for heavy load of any one of [1] to [4] above, wherein a thickness of the base rubber layer is 1 to 70% of a total thickness of the tread.

[6] The pneumatic tire for heavy load of any one of [1] to [5] above, comprising four or more belt layers inside in a tire radial direction of the base rubber layer, wherein at least one surface of an outer surface in a tire radial direction of the belt layer on the outermost side in the tire radial direction and an outer surface in the tire radial direction of the belt layer having the widest width is covered with a reinforcing rubber layer that terminates without reaching a tire equatorial plane, and wherein a value of tan δ at 70° C. (70° C. tan δ) of the rubber composition of the reinforcing rubber layer is larger than a value of tan δ at 70° C. (70° C. tan δ) of the rubber composition of the base rubber layer.

[7] The pneumatic tire for heavy load of any one of [1] to [6] above, wherein a width w of the reinforcing rubber layer is 10 to 40% (preferably 15 to 30%) of a tread width W of the tread.

[8] The pneumatic tire for heavy load of any one of [1] to [7] above, wherein the maximum thickness of the reinforcing rubber layer is 5 to 25% of a groove depth of a width direction groove present at a position of ¼ the tread width of the tread from a tire equator line.

[9] The pneumatic tire for heavy load of any one of [1] to [8] above, wherein the rubber composition of the base rubber layer comprises a glycerin fatty acid ester.

REFERENCE SIGNS LIST

1. Tread part
2. Carcuss
3. Belt
3a, 3b, 3c, 3d, 3e. Belt layer
4. Base rubber layer
5. Cap rubber layer
6. Tread rubber
7. Reinforcing rubber layer
E. Tire equatorial plane
w. Width of reinforcing rubber layer
W. Tread width of tread
t. Maximum thickness of reinforcing rubber layer
51. Tire assembly
52. Test device
56. Protrusion jig
56a. Top surface of protrusion jig
58. Base member
58a. Top surface of base member (reference surface)
62. Slide bar
64. Vertical movement part
66. Axis
71. Pedestal 72. Protrusion part
74. Inner edge of protrusion jig

What is claimed is:
1. A pneumatic tire for heavy load comprising,
a tread having a cap rubber layer of a tread surface and a base rubber layer adjacent to inside in a tire radial direction of the cap rubber layer, the cap rubber layer and the base rubber layer being composed of a rubber composition comprising a filler component that includes carbon black and a rubber component that comprises an isoprene-based rubber, and
four or more belt layers inside in a tire radial direction of the base rubber layer, wherein at least one surface of an outer surface in a tire radial direction of the belt layer on the outermost side in the tire radial direction and an outer surface in the tire radial direction of the belt layer having the widest width is covered with a reinforcing rubber layer that terminates without reaching a tire equatorial plane,
wherein
the rubber component of the base rubber layer rubber composition comprises 85% by mass or more of the isoprene-based rubber,
the filler component of the base rubber layer rubber composition comprises silica and 20 to 60 parts by mass of carbon black based on 100 parts by mass of the rubber component,
the base layer has a thickness that is 1 to 70% of the tread total thickness,
the rubber composition of the base rubber layer exhibits an acetone extraction amount that is less than 4.0% by mass, wherein the acetone extraction amount is measured in accordance with JIS K 6229-3: 2015,
the rubber composition of the base rubber layer has a tan δ at 70° C. (70° C. tan δ) of less than 0.040, wherein the value of tan δ at 70° C. (70° C. tan δ) is measured in accordance with JIS K 6394: 2007,
if a modulus at 200% elongation at 23° C. of the rubber composition of the base rubber layer is defined as M200b (MPa) and a modulus at 200% elongation at 23° C. of the rubber composition of the cap rubber layer is defined as M200c (MPa), wherein the modulus at 200% elongation is measured in accordance with JIS K 6251: 2017, then M200b and M200c satisfy the following inequality (1): 0≤M200c−M200b≤5 (1), and
when the rubber composition of the base rubber layer has a strength at break at 23° C. defined as TB (MPa), wherein the strength at break is measured in accordance with JIS K 6251: 2017, and has an elongation at break at 23° C. defined as EB (%), the tan δ at 70° C. (70° C. tan δ) of the rubber composition of the base rubber layer, TB and EB satisfy the following inequality (2): TB×EB/70° C. tan δ≥4.5×10$^5$ (2).

2. The pneumatic tire for heavy load of claim 1, wherein a tan δ at 70° C. (70° C. tan δ) of the rubber composition of the base rubber layer is less than 0.040.

3. The pneumatic tire for heavy load of claim 1, wherein, when a strength at break at 23° C. of the rubber composition of the base rubber layer is defined as TB (MPa) and an elongation at break at 23° C. is defined as EB (%), the tan δ at 70° C. (70° C. tan δ) of the rubber composition of the base rubber layer, TB and EB satisfy the following inequality (2):

$$TB \times EB/70° C. \tan \delta \geq 24.5 \times 10^5 \quad (2)$$

4. The pneumatic tire for heavy load of claim 1, wherein the rubber component of the base rubber layer comprises a butadiene rubber.

5. The pneumatic tire for heavy load of claim 1, wherein a value of tan δ at 70° C. (70° C. tan δ) of the rubber composition of the reinforcing rubber layer is larger than a value of tan δ at 70° C. (70° C. tan δ) of the rubber composition of the base rubber layer.

6. The pneumatic tire for heavy load of claim 1, wherein a width w of the reinforcing rubber layer is 10 to 40% of a tread width W of the tread.

7. The pneumatic tire for heavy load of claim 1, wherein the maximum thickness of the reinforcing rubber layer is 5 to 25% of a groove depth of a width direction groove present at a position of ¼ the tread width of the tread from a tire equator line.

8. The pneumatic tire for heavy load of claim 1, wherein the rubber composition of the base rubber layer comprises a glycerin fatty acid ester.

9. The pneumatic tire for heavy load of claim 1, wherein the carbon black of the rubber composition of the base rubber layer has a nitrogen adsorption specific surface area ($N_2SA$) of 60 m$^2$/g or more.

10. The pneumatic tire for heavy load of claim 1, wherein the rubber composition comprises 20 to 60 parts by mass of carbon black based on 100 parts by mass of the rubber component.

11. The pneumatic tire for heavy load of claim 1, wherein the rubber component of the base rubber layer comprises 85% by mass or more of the isoprene-based rubber.

12. The pneumatic tire for heavy load of claim 11, wherein the carbon black of the rubber composition of the base rubber layer has a nitrogen adsorption specific surface area ($N_2SA$) of 60 m$^2$/g or more.

13. A pneumatic tire for heavy load comprising,
a tread having a cap rubber layer of a tread surface and a base rubber layer adjacent to inside in a tire radial direction of the cap rubber layer, the cap rubber layer and the base rubber layer being composed of a rubber composition comprising carbon black and a rubber component that comprises an isoprene-based rubber, and
four or more belt layers inside in a tire radial direction of the base rubber layer, wherein at least one surface of an outer surface in a tire radial direction of the belt layer on the outermost side in the tire radial direction and an outer surface in the tire radial direction of the belt layer having the widest width is covered with a reinforcing rubber layer that terminates without reaching a tire equatorial plane,
wherein
the base layer has a thickness that is 1 to 70% of the tread total thickness,
the rubber composition of the base rubber layer exhibits an acetone extraction amount that is less than 4.0% by mass, wherein the acetone extraction amount is measured in accordance with JIS K 6229-3: 2015,
if a modulus at 200% elongation at 23° C. of the rubber composition of the base rubber layer is defined as M200b (MPa) and a modulus at 200% elongation at 23° C. of the rubber composition of the cap rubber layer is defined as M200c (MPa), wherein the modulus at 200% elongation is measured in accordance with JIS K 6251: 2017, then M200b and M200c satisfy the following inequality (1): 0≤M200c−M200b≤5 (1), and
when the rubber composition of the base rubber layer has a strength at break at 23° C. defined as TB (MPa), wherein the strength at break is measured in accordance with JIS K 6251: 2017, and has an elongation at break at 23° C. defined as EB (%), the tan δ at 70° C. (70° C. tan δ) of the rubber composition of the base rubber layer, TB and EB satisfy the following inequality (2):

$$TB \times EB / 70° C. \tan \delta \geq 4.5 \times 10^5 \quad (2).$$

14. The pneumatic tire for heavy load of claim 13, wherein a tan δ at 70° C. (70° C. tan δ) of the rubber composition of the base rubber layer is less than 0.040.

15. The pneumatic tire for heavy load of claim 13, wherein a value of tan δ at 70° C. (70° C. tan δ) of the rubber composition of the reinforcing rubber layer is larger than a value of tan δ at 70° C. (70° C. tan δ) of the rubber composition of the base rubber layer.

* * * * *